Jan. 19, 1932. J. R. SMITH ET AL 1,841,554
COMPUTING SCALE
Filed Aug. 2, 1929
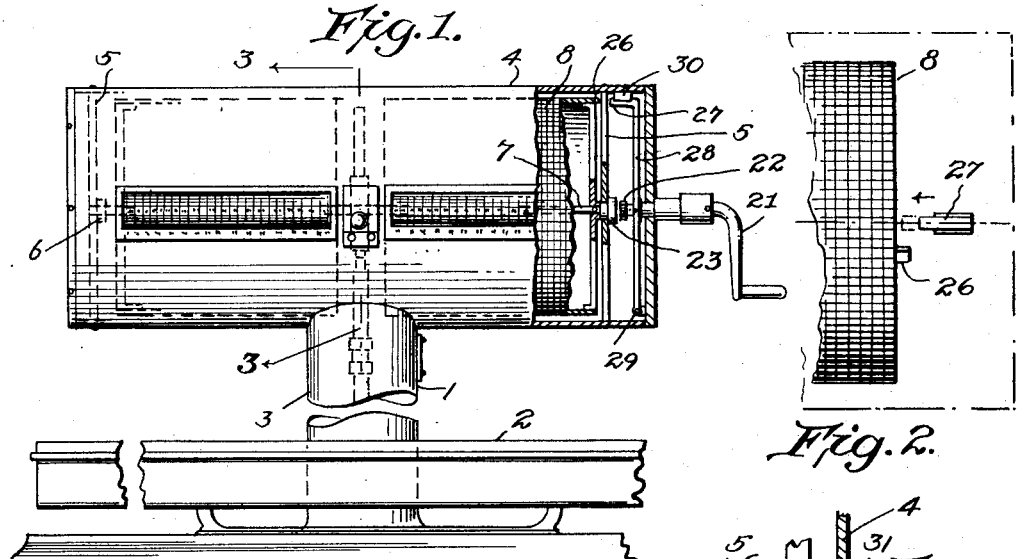
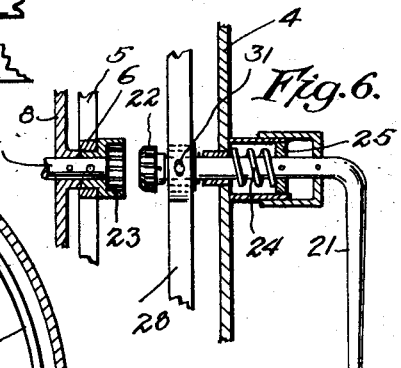
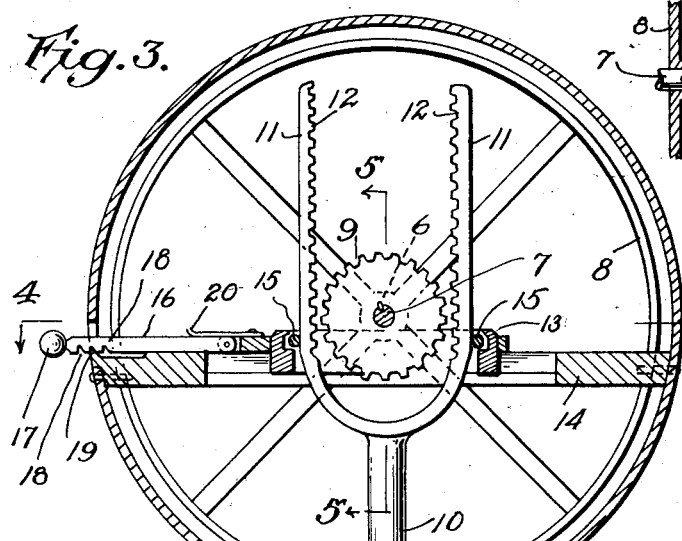
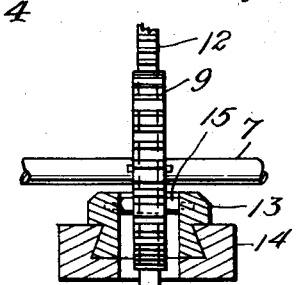
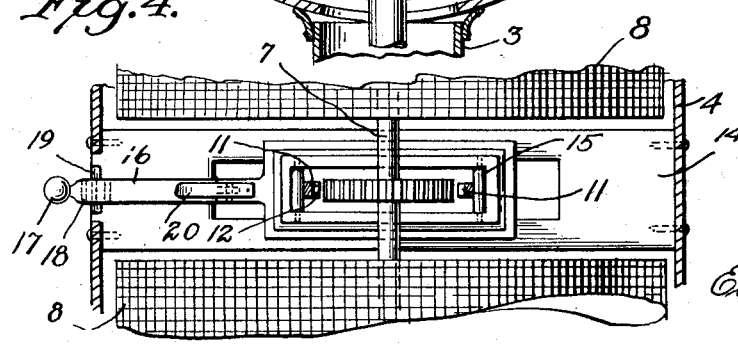
Inventors
J. R. Smith
R. H. Hancock
Eccleston & Eccleston,
Attorneys Patented Jan. 19, 1932

1,841,554

UNITED STATES PATENT OFFICE

JAMES R. SMITH AND RUSSEL H. HANCOCK, OF GOSPORT, INDIANA

COMPUTING SCALE

Application filed August 2, 1929. Serial No. 382,884.

This invention relates to computing scales of the rotary drum type and has particular reference to scales of this type which are used in connection with the weighing of crates of poultry and other live stock, although also useful in connection with the weighing of candies and other packaged goods.

One of the primary objects of the invention consists in the provision of means by which the drum bearing the indicia to indicate the cost and weight of the goods may be caused to rotate in the same direction when goods are taken from the scale platform as when initially applied to the platform.

A further object of the invention resides in the provision of such means which will permit the connection between the indicating drum and the scale platform to be so adjusted as to free the drum and permit it to be manually moved to the zero position.

Another object of the invention consists in the provision of a stop in conjunction with the manually operated means for moving the drum, whereby the stop is moved into operative position with respect to the drum by the inward movement of the drum operating means.

Other objects of the invention will be apparent from the following description when taken in connection with the accompanying drawings, in which Figure 1 is a front elevational view of the scale, parts being broken away to more clearly show the construction.

Figure 2 is a detailed view showing in dotted outline the inner position of the stop for the drum.

Figure 3 is a vertical sectional view through the drum and casing therefor taken on line 3—3 of Figure 1.

Figure 4 is a fragmentary horizontal view through the drum casing taken on line 4—4 of Figure 3.

Figure 5 is a detail vertical sectional view taken on line 5—5 of Figure 3; and

Figure 6 is an enlarged detail sectional view of the manually operated means for rotating the drum.

Referring to the drawings in greater detail, the numeral 1 indicates generally a computing scale of any conventional construction provided with a platform 2 on which the goods to be weighed are placed. The numeral 3 indicates a hollow standard in which the usual connection from the scale platform to the indicating mechanism is mounted; while the numeral 4 indicates a cylindrical casing in which a drum bearing suitable indicia as to weight, selling price, etc., is rotatably mounted.

In the present construction the casing 4 is provided with a spider 5 at each end thereof in which are formed bearings 6 to receive a shaft 7 to which is keyed an indicia bearing drum 8. This drum in the present instance is comprised of two similar sections keyed to the shaft at opposite sides of its middle point. Also keyed to the shaft 7 is a pinion 9 adapted to operate in conjunction with other elements of the mechanism to be described to rotate the drum, and thus indicate the weight and selling price of the goods being weighed.

The weighing mechanism forms no part of the present invention, and may be of any conventional construction. Such devices are usually provided with a main operating arm connecting the scale platform with the indicia bearing member, and in the present instance this member which is indicated by the numeral 10, is forked at its upper end to provide the two upwardly extending arms 11, each of which is provided with a rack 12 facing inwardly toward the shaft 7 to which the indicating drum is keyed. The racks 12 are spaced apart a distance slightly greater than the diameter of the pinion 9 and due to the fact that the main operating arm is pivoted at its lower end, it is apparent that the forked member on which the racks 12 are formed may be moved laterally with respect to the pinion so as to cause either of said racks to mesh with the pinion.

For the purpose of imparting a lateral movement to the racks 12 so as to cause them to selectively engage the pinion 9 we have provided a block 13 provided with a dovetail connection with a horizontally disposed guide bar 14 mounted within the casing 4 midway between the ends thereof. The block 13 is preferably provided with rollers 15 adapted to bear against the outer faces of the arms 11 on which the racks 12 are formed, and this block may be slid back and forth on the guide bar 14 so as to cause either of said racks to engage the pinion 9. One means which may be employed for operating the block 13 consists of an arm 16 pivotally connected to the block and provided with an operating knob 17. This arm, as will be noted from an inspection of Figure 3, is provided with three notches 18 adapted to cooperate with a lug 19 formed on the casing 4. Arm 16 is normally held in its horizontal position by means of a spring 20 so that the particular notch 18 may be releasably held in engagement with the lug 19. By reason of the three notches 18 just referred to it will be apparent that the forked member bearing the racks 12 may be locked in either of three positions, namely, that shown in Figure 3 in which both racks are out of mesh with the pinion 9, or in a position to either side of that shown so that the one or the other of the racks 12 may be brought into mesh with the pinion.

If the knob 17 of the operating arm 16 is drawn to the left (Figure 3) so that the innermost notch 18 is in engagement with the lug 19 the rack 12 at the right of Figure 3 will be brought into mesh with the pinion 9. After a crate of poultry or the like is placed upon the scale platform 2, its weight will draw the member 10 downwardly and thus impart a rotative movement in a clockwise direction to the pinion 9, thus causing the drum to rotate and cause the proper indicia to register with the indicating arm or pointer on the fixed casing 4. If the knob 17 is now moved so that the middle notch 18 is brought into engagement with the lug 19, both racks 12 will be out of mesh with the pinion 9 leaving the same free to be rotated to bring the zero marking on the drum into register with the pointer on the casing 4. If the handle 17 is now moved so that the outermost of the notches 18 is brought into engagement with the lug 19, then the rack 12 at the left of Figure 3 will be brought into engagement with the pinion 9 so that if one or more articles be removed from the package just weighed, the member 10 will be raised slightly and through the action of the operative rack 12 cause the pinion 9 to again be rotated in a clockwise direction so as to indicate the weight and cost of the goods removed from the package. It will be apparent, therefore, that by a mere shifting of the arm 17 the indicating drum 8 may be caused to rotate in the same direction not only when the package is initially applied to the weighing platform, but also when a portion or all of the contents are removed therefrom.

For the purpose of returning the drum to initial position during the process of weighing a complete package as well as portions thereof, we have provided a crank arm 21 having a bearing in one end of the casing 4 and provided with a clutch member 22 on its inner end adapted to cooperate with a complemental clutch member 23 fixed to the adjacent end of the shaft 7 of indicating drum 8. The crank arm 21 is normally moved outwardly so as to disengage clutch member 22 from clutch member 23 by means of a coil spring 24 having one end in engagement with the casing 4 and its other end in engagement with a disc 25 fixed to the shaft of the crank arm 21. By pushing inwardly on the crank arm 21 it will be obvious that the clutch members 22 and 23 may be brought into engagement so as to impart a rotary movement to the drum 8 provided, of course, that the arm 16 is moved to a neutral position in which both racks 12 are out of engagement with the pinion 9.

It is desirable, of course, that some means be provided to stop the manual rotation of the drum 8 when the zero marking thereon is opposite the arrow or other indicating means on the casing 4, and to this end the drum 8 is provided with a lug 26 adapted to cooperate with a movable stop 27 carried by an arm 28 pivotally connected at 29 adjacent the bottom of casing 4 at that end on which the crank arm 21 is mounted. This stop 27 is slidably mounted in an inverted U-shaped guide member 30 and the arm is caused to move back and forth on its pivot 29 by reason of its connection 31 with the shaft of crank arm 21. As the arm 21 is moved inwardly to bring the clutch members 22 and 23 into operative relation, the stop 27 will be moved automatically into the path of movement of the lug 26 carried by drum 8, consequently the crank arm 21 may be manually rotated in the proper direction and the drum will be automatically stopped with its zero marking in register with the indicating arrow on the casing by reason of the lug 26 coming into engagement with the movable stop 27.

The operations of the several parts have been fully described in connection with the description of the details of construction. However, a brief description of the general operation will perhaps more clearly set forth the function of the complete apparatus.

Assuming that a crate of poultry is to be weighed and sold, the same is placed on the scale platform 2, the rack 12 at the right of Figure 3 having previously been placed in mesh with the pinion 9. The reading on the indicating drum having been noted, the arm 16 is moved into its neutral position as shown in Figure 3 so as to bring the racks 12 into inoperative position. The crank arm 21 is then manually rotated until the lug 26 is brought into engagement with the stop 27 which has been brought into the path of movement of the lug 26 by reason of the inner movement of the crank arm 21 to engage the clutch members. By this means the zero point on the indicating or computing drum has been returned to its initial position with the zero marking in registration with the arrow or other indication on the casing 4. The operating handle 16 is now moved so as to bring the other rack 12 (at the left of Figure 3) into mesh with the pinion 9, the clutch 22—23 having, of course, been disengaged by the return of spring 24 to its normal extended position. If now, one, two, three or any number of the fowls are removed from the crate, the rack 12 at the left of Figure 3 will cause a clockwise rotation of the pinion 9 so as to cause the indicating drum 8 to rotate in a clockwise direction and register the weight and cost of the fowls removed. It will thus appear that by reason of this simple shifting of the connection between the drum and the weighing scale proper, the indicating drum 8 will be caused to rotate in the same direction irrespective of whether material is being added to or removed from the scale platform. Similarly, if a box is to be loaded with goods, the same may be placed on the scale platform and its weight noted; the operative rack 12 may then be moved to neutral position through the medium of arm 16 and the drum 8 returned to zero position by crank arm 21. The particular rack 12 may then be again moved into mesh with pinion 9, and as the goods are placed in the box or crate the exact weight and value of the goods per se will be registered on the drum.

In accordance with the patent statutes we have described what we now believe to be the preferred form of our invention but obviously various changes may be made in the details of construction without departing from the spirit of the invention, and all such are intended to be included in the scope of the appended claims.

Having fully described our invention what we claim as new and desire to secure by Letters Patent is:

1. In a weighing scale, a rotatably-mounted drum having suitable indicia thereon, an operative connection between said scale and drum, said connection being shiftable to an inoperative position to permit free rotation of the drum, manually operable means for rotating the drum, and a removable stop for said drum.

2. In a weighing scale, a rotatably-mounted drum having suitable indicia thereon, an operative connection between said scale and drum, said connection being shiftable to an inoperative position to permit free rotation of the drum, manually operable means for rotating the drum, a removable stop for said drum, and an operative connection between said manually operable means and stop.

3. In a weighing scale, a rotatably mounted drum having suitable indicia thereon, an operative connection between the scale and drum, said connection being shiftable to an inoperative position to permit free rotation of the drum, and means for shifting said connection, said means comprising a slidably mounted block through which said connection extends and means for sliding said block on its mounting.

4. In a weighing scale, a rotatably mounted drum having suitable indicia thereon, an operative connection between the scale and drum, said connection being shiftable to an inoperative position to permit free rotation of the drum, and means for shifting said connection, said means comprising a slidably mounted block through which said connection extends, anti-friction rollers on said block for cooperation with said connection, and means for sliding said block on its mounting.

J. R. SMITH.
R. H. HANCOCK.